April 20, 1926.  O. E. BARTHEL  1,581,481
ENGINE HEAD
Filed August 9, 1922  2 Sheets-Sheet 1
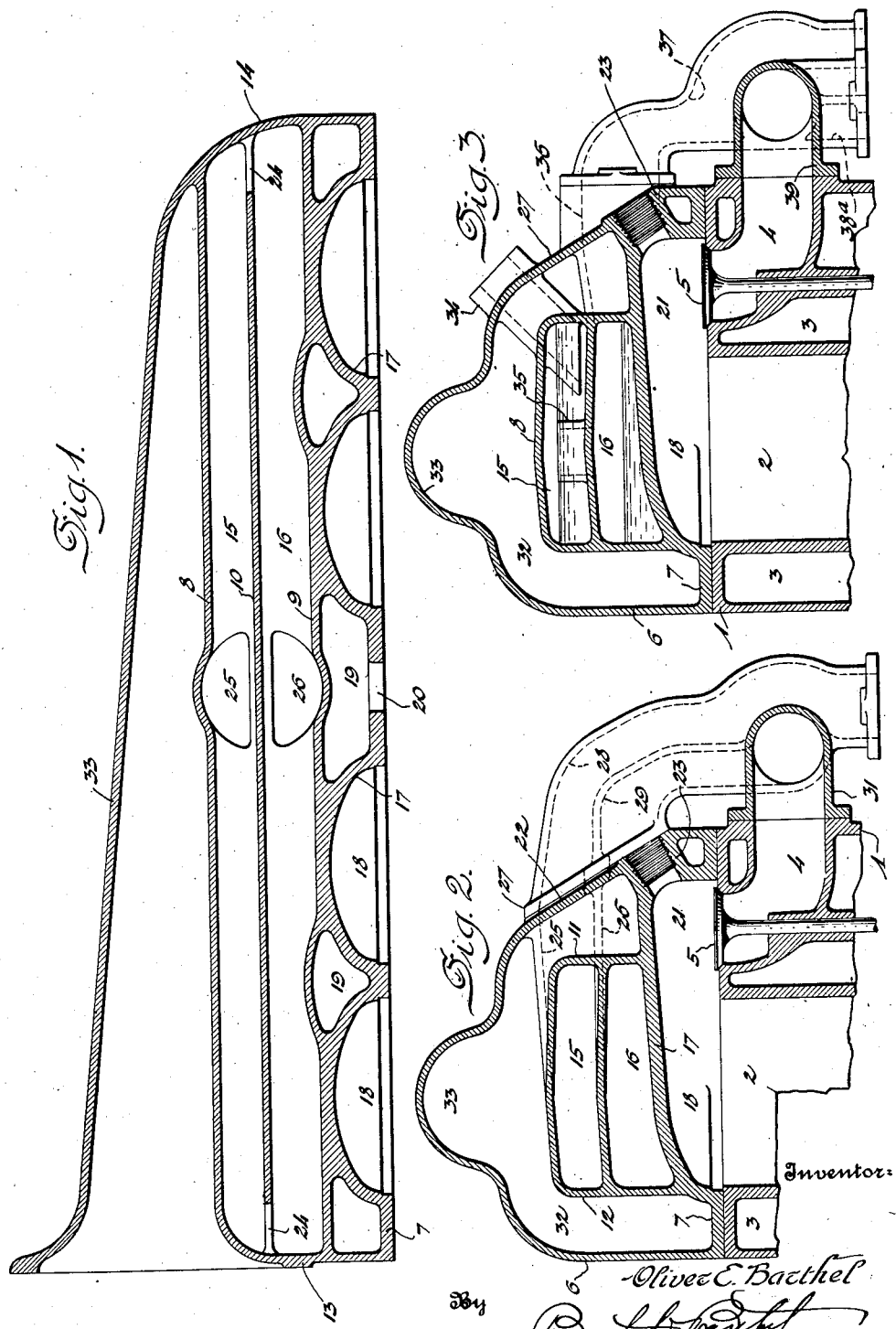
Inventor:
Oliver E. Barthel April 20, 1926.
O. E. BARTHEL
1,581,481
ENGINE HEAD
Filed August 9, 1922    2 Sheets-Sheet 2
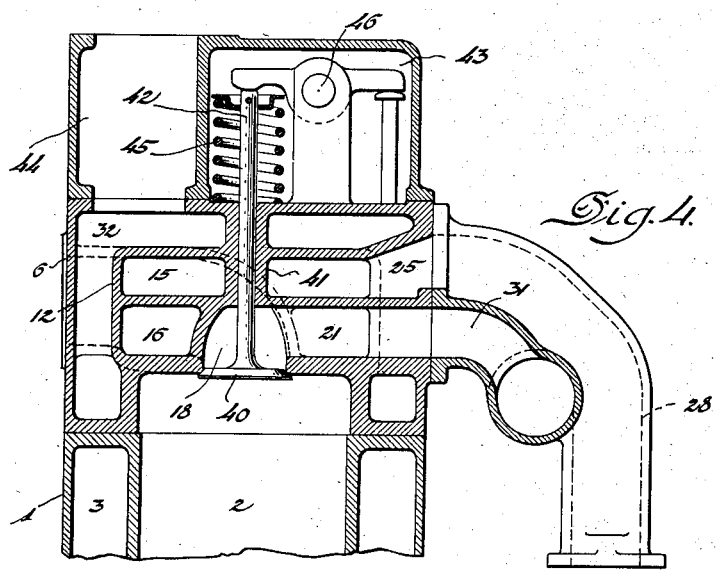
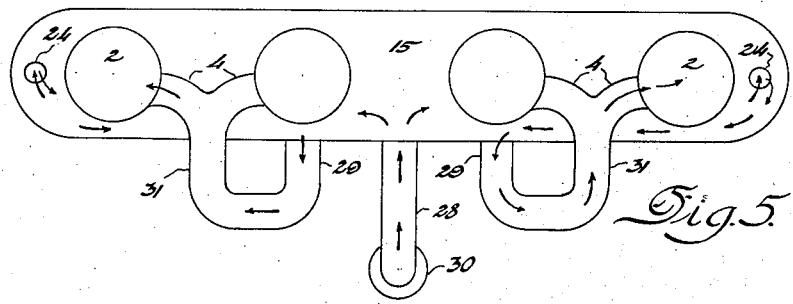
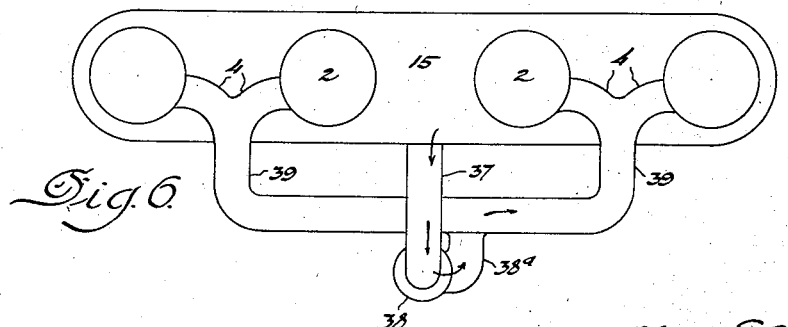

Patented Apr. 20, 1926.

1,581,481

UNITED STATES PATENT OFFICE.

OLIVER E. BARTHEL, OF DETROIT, MICHIGAN.

ENGINE HEAD.

Application filed August 9, 1922. Serial No. 580,595.

*To all whom it may concern:*

Be it known that I, OLIVER E. BARTHEL, a citizen of the United States of America, residing at Detroit, in the county of Wayne and State of Michigan, have invented certain new and useful Improvements in Engine Heads, of which the following is a specification, reference being had therein to the accompanying drawings.

Various types of tractors, commercial and pleasure vehicles have internal combustion engines, using heavy fuels, for instance kerosene and some tractors and vehicles are provided with means for preheating the fuel to obtain an initial vaporization and place the fuel in better condition for vaporization in a carbureter or vaporizing device. It is a well known fact that if vaporized fuel is thoroughly dried and heated, it is in better condition for combustion and the deposit of carbon in engine cylinders, chambers or passages is reduced to a minimum. With this end in view some carbureters have been constructed and combined or arranged with the exhaust manifold of an engine so that the exhaust gases may be utilized for preheating the heavy fuel before or after vaporization, and when the heavy fuel is heated prior to vaporization care must be taken not to crack the fuel. This is a problem that has not been solved in connection with some tractors because the heating of the fuel is accomplished in one stage and on account of the uncertainty of the temperature of burned gases and the difficulty of controlling the temperature, it has been practically impossible to prevent the cracking of heavy fuels.

My invention aims to eliminate the expensive and complicated construction about a carbureter wherein fuel is preheated by providing an engine with a cylinder head in which fuels may be heated in a plurality of stages, and thus brought up to a desired temperature less than the boiling point of the fuel. In one instance, I may conduct vaporized fuel from a carbureter to the cylinder head and there gradually heat the vaporized fuel until it is thoroughly dried and in the best condition for combustion. The heated vaporized fuel may be conducted direct from the cylinder head to the intake ports or valves of the engine. In another instance, I may place the liquid fuel in the engine head to be heated and conducted from the engine head to the carbureter to be vaporized, and then from the carbureter to the engine cylinders in the usual manner. In either instance, the vaporized or liquid fuel is subjected to heat, by conduction, from walls subjected to the heating action of explosions and exhaust or burned gases, and by proportioning the heating chambers relative to the combustion chambers the heating of fuel may be gradually stepped up to within a safe limit of the cracking temperature of the fuel used.

My invention further aims to provide an engine head that may be advantageously used in connection with a Fordson tractor insomuch that an ordinary carbureter and my improved engine head can be readily substituted for those now in use, without causing any material modification or change in other parts of the power plant of the tractor. By eliminating the present type of carbureter and adjustments incident to its use, I not only reduce the cost of manufacture of the Fordson tractor, but reduce the care of operating such a tractor.

My improved engine cylinder head and the system of preheating fuel will be hereinafter described and then claimed, and reference will now be had to the drawings, wherein—

Figure 1 is a longitudinal sectional view of an engine head in accordance with my invention;

Fig. 2 is a cross sectional view of the same as designed for heating vaporized fuel;

Fig. 3 is a similar view of the head as designed for heating a liquid fuel;

Fig. 4 is a similar view showing a head adapted for overhead valves;

Fig. 5 is a diagrammatic view of engine cylinders illustrating the system of heating vaporized fuel, and Fig. 6 is a similar view illustrating the system of heating liquid fuel.

In the drawing the reference numeral 1 denotes a cylinder block having cylinders 2, a water jacket 3, and intake passages 4, said intake passages being normally closed by underhead puppet valves 5 which open away from the intake passages 4.

Mounted on top of the cylinder block 1 is a cylinder head comprising a housing or water jacket 6 having a bottom wall 7 seated on the cylinder block and suitably connected thereto. The housing 6 extends throughout the length of the cylinder block and in said housing and spaced from the walls thereof is a substantially rectangular casing which extends throughout the length of the housing, said casing comprising a top wall 8, a bottom wall 9 and an intermediate wall 10. These walls are connected by side walls 11 and 12 with all of said walls cooperating with end walls 13 of the housing in forming superposed chambers 15 and 16.

The bottom wall 7 of the housing 6 is crenelated or formed with a plurality of dome shaped head walls 17 for the cylinders 2, said head walls providing combustion chambers 18 separated by water jacket spaces 19 under the chambered casing within the housing, said water jacket spaces communicating with the water jacket 3 by virtue of an opening 20 in the bottom wall 7 of the housing 6, intermediate the ends thereof. By reference to Fig. 1 it will be noted that the head walls join the casing bottom wall 9 and extend in a lateral direction towards one side of the housing 6, as best shown in Figs. 2 and 3 to elongate the combustion chambers 18 and place the same in communication with the intake passages 4, when the intake valves 5 are open. The chamber extensions are designated 21 and are connected to an inclined side wall 22 of the housing 6 by apertured bosses or spark plug holders 23 which permit of spark plugs being mounted in the engine head to extend into the extensions 21 of the combustion chambers 18 and thus afford ignition means for an explosive charge in either of the combustion chambers 18.

Considering the casing within the housing 6, the intermediate wall 10 of said casing had end opening 24 establishing communication between the chambers 15 and 16 and connecting the side wall 11 of the casing to the inclined wall 22 of the housing 6 are integral conduits 25 and 26, the former communicating with the chamber 15 and the latter with the chamber 16, this communication being intermediate the ends of the chamber.

Suitably connected to the inclined wall 22 of the housing 6 is a manifold 27 having passages 28 and 29, the former communicating with the conduit 25 and the latter with the conduit 26. The manifold 27 extends downwardly at the side of the cylinder block and is adapted to be connected to a carbureter 30, shown diagrammatically in Fig. 5. The passage 29 of the manifold has branch connections 31 with the intake passages 4 of the cylinder block, and vaporized fuel from the carbureter 30 passes through the passage 28 of the manifold 27 and through the conduit 25 of the housing 6 into the upper chamber 15 of the enclosed casing. The vaporized fuel moves towards the ends of the chamber 15, downwardly through the openings 24 into the chamber 16 and then towards the middle portion of the chamber where the fuel enters the conduit 26, passage 29, connection 31, and intake passage 4, to eventually enter combustion chambers 18.

The space between the housing 6 and the chambered casing within said housing constitutes a water jacket 32 formed with a tapered connection 33, said connection being tapered outwardly from one end of the housing 6 to the opposite end thereof. The walls 8, 11 and 12 and to a certain extent the intermediate wall 10 of the enclosed casing are adapted to be heated by conduction, consequently the chambers 15 and 16 will be heated and cause vaporization of any globules of fuel that enter the chambers from the carbureter without being vaporized. Such liquid fuel will be deposited on the walls of the chambers 15 and 16 and if not immediately vaporized will collect at the side walls 11 and 12 of the casing because the walls 8 and 10 are slightly arched in cross section, as brought out in Figs. 2 and 3, thus providing gutters adjacent the walls 11 and 12 to collect any liquid fuel. It is practically impossible for any liquid fuel to enter the intake passages 4 for the reason that if such fuel escapes atomizing or vaporization at the carbureter it encounters two stages of heat within the superposed chambers 15 and 16, the latter being at a higher temperature than the former on account of the head walls 17 of the combustion chambers 18 being integral with the bottom wall 9 of the enclosed casing. The conduction of heat to the lower part of the enclosed casing is greater than to the upper part and it is by virtue of such two-stage heating that the atomized or vaporized fuel may be brought into the best dry state for ignition purposes.

The above briefly outlines a system by which atomized or vaporized fuel may be further heated and vaporized to insure a good explosive mixture, and the configuration of the engine head is such that it may be readily substituted for the head now used on a Fordson tractor engine.

As pointed out in the beginning, I may pre-heat the liquid fuel before it reaches the carburetor and this may be accomplished by a change in the manifold 27 and a slight change in the engine head, both of such changes being illustrated in Figs. 3 and 6. First, I provide the inclined wall 27 of the housing 6 with an angularly disposed connection 34 communicating with the chamber 15, intermediate its ends, and adapted to supply liquid fuel to said chamber. The openings 24 at the ends of the chamber 15, are surrounded by sleeves or walls 35 over which the liquid fuel must flow, after reaching a predetermined level within the chamber 15, to enter the chamber 16, and from this chamber the liquid fuel passes through a conduit 36 and a manifold passage 37 to a carbureter 38 where the liquid fuel is either atomized or vaporized and in such form returns through a manifold passage 38ª to an inlet connection 39 communicating with the intake passages 4 of the cylinder block 1. In this manner the pre-heating of fuel assists vaporization or atomization in the carbureter 38, and by the liquid fuel absorbing heat from the enclosed casing it contributes towards cooling the engine head.

The two systems of heat treatment have been brought out diagrammatically in Figs. 5 and 6 where the passages of the manifolds have been separated, and the flow or movement of fuel indicated by arrows. So far either system may be used with the underhead puppet valves, but in Fig. 4 I show how overhead valves 40 may be employed by providing the housing and casing with guides 41 for valve rods 42, the rods 42 extending into a chamber 43 of a water jacket 44. The valve rods 42 are supported by coiled expansion springs 45 within the chamber 43 and a rocker shaft 46 is adapted to open the puppet valves 40 in timed relation. This is simply an example of overhead valve construction that may be used and since there are various types of internal combustion engines, I do not care to confine my invention other than set forth in the appended claims.

What I claim is:—

1. In an engine adapted to be supplied with fuel from a carbureter, a head adapted for mounting on a cylinder block of the engine, said head having intake passages adapted to receive fuel prior to the carbureter, said head comprising a housing serving as a water jacket, a casing within said housing heated by explosions, burned gases, and the contents of the water jacket and affording two stages of heat for fuel passing through said casing to the carbureter, and means in said casing to cause fuel to travel in directions to be subjected to two stages of heat.

2. An engine head as called for in claim 1, wherein said casing has a flat horizontal partition causing fuel to travel back and forth in said casing.

3. An engine head as called for in claim 1, wherein said housing has a crenelated fuel supporting bottom wall contacting with said casing and providing combustion chambers for the cylinders of said cylinder block.

4. In an engine head, an oblong casing adapted to hold fuel preparatory to supplying it to a carbureter, a housing at the top and sides of said casing and throughout the length thereof and adapted to have water circulated therethrough, said housing having a fuel supporting bottom wall of such configuration as to form combustion chambers for the engine, and means extending through said housing adapted to conduct fuel to and from said casing.

5. In an engine head, a casing adapted to have fuel pass therethrough, a horizontal partition in said casing, provided with end openings, a housing at the top and sides of said casing and throughout the length thereof and adapted to have water circulated therethrough, said housing having a fuel supporting bottom wall of such configuration as to form combustion chambers for the engine, and means extending through said housing and communicating with said casing intermediate the ends thereof to conduct fuel to and from said casing.

6. An engine head comprising a water jacket, superposed chambers therein, communicating with each other and the lower chamber forming walls of combustion chambers so that both of said chambers may be heated by conduction, and means establishing communication with said chambers adapted to conduct fuel to and from said chambers.

7. In an engine adapted to be supplied with fuel from a carburetor, and head providing a water jacket and integral superposed communicating chambers throughout the length of said water jacket adapted to have fuel pass therethrough prior to entering the carburetor, the communication between the chambers being such that the fuel is caused to pass from the central portion of one chamber to the ends of both chambers and return to the central portion of the other chamber.

8. An engine head comprising a water jacket having a bottom crenelated wall affording combustion chambers for cylinders, and stationary fuel chambers integral with the bottom wall of said water jacket and adapted to be heated by conduction from the jacket bottom wall so that the fuel in one chamber is heated to a greater degree than the fuel in the other, and means for causing fuel to be progressively heated by said chambers.

In testimony whereof I affix my signature.

OLIVER E. BARTHEL.